W. A. Shaw.
Lining Pipes with Tin.
No. 2219 Reissued Apl 3. 1866.
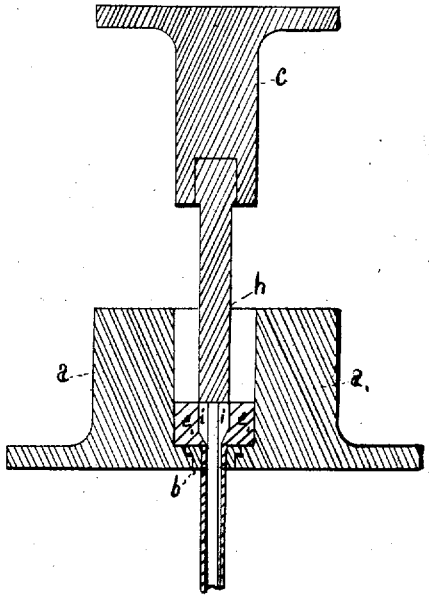
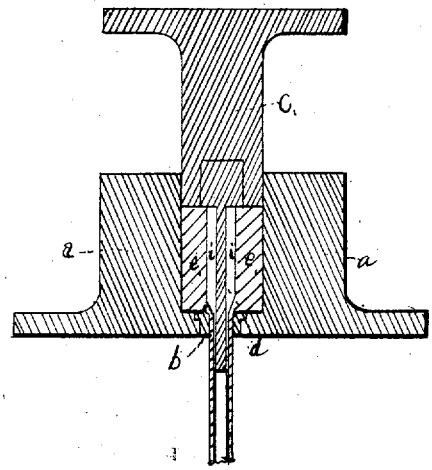
Inventor:
W. Anthony Shaw
Witnesses:
Lemuel W. Serrell
Chas. H. Smith

UNITED STATES PATENT OFFICE.

W. ANTHONY SHAW, OF NEW YORK, N. Y.

IMPROVED MODE OF LINING PIPES WITH TIN.

Specification forming part of Letters Patent No. 37,877, dated March 10, 1863; Reissue No. 2,219, dated April 3, 1866.

*To all whom it may concern:*

Be it known that I, W. ANTHONY SHAW, of the city and county and State of New York, have invented, made, and applied to use, a certain new and useful Improvement in the Mode of Lining Lead Pipe with Tin; and I do hereby declare the following to be a full, clear, and exact description of the same, reference being had to the annexed drawings, making part of this specification, in which—

Figure 1 is a vertical section through a part of my press, arranged ready to receive the lead to form the pipe; and Fig. 2 is a similar section arranged to show the pipe in process of formation.

The following detail description of my invention will enable any one skilled in the arts to which it appertains to practice the same.

In the drawings, *a* is a cylinder, made in any usual manner with a die at *b*, of the size required for the exterior of the pipe. *c* is a ram fitting the cylinder *a*, all of the ordinary or desired construction. *d* is the core attached into the end of the ram *c*. A hydraulic press is to be employed as now usual to cause the ram to press the ingot of lead through the cylinder and out at the said die *b*, between that and the core *d*, and form pipe.

I have represented in Fig. 2 this operation of making pipe with a lining of tin or its alloys. In this *e* shows the ingot of lead, (colored blue,) and *i* the ingot of tin, (colored red for greater clearness;) and it will be seen that as these two ingots are by the hydraulic pressure applied to the ram *c*, driven out through the die *b*, the tin forms a complete and perfect lining or tube in the lead pipe. In order that these ingots may be introduced in the cylinder, the press must be fitted so that the ram *c* and core *d* can be drawn out of the cylinder, and I prefer that the core *d* be removed and a second core, *h*, introduced, as seen in Fig. 1, which core is to be the size of the exterior of the tin ingot. When this core is introduced as shown, then the lead is to be cast into the cylinder, and when it has consolidated said core *h* is to be withdrawn and the core *d* introduced and passed into the hole of the previous ingots, a portion of which remains in the cylinder *a*, and after this core is introduced, then the space between it and the lead is to be filled with melted tin.

It will be evident that the tin might be cast separately and introduced within the lead ingot. I prefer to work off only about two-thirds of the contents of the cylinder, before adding a new change, as aforesaid.

In case the tin ingot, in consequence of being harder than the lead, should draw through faster than the lead, it may be made rather longer, and the end pass up into a recess around the base of the core *d*.

It will be seen from what has been above written that the practice of my invention consists, substantially, in manufacturing metal pipe or tubing of any two of the ductile metals or their alloys by pressing them together through a die in such manner that in forming the pipe the one metal will form a lining in the other, making, in fact, at one operation a double or laminated pipe of different metals.

Now, I do not intend to confine my claims to the manufacture of pipe in this way by the use of any particular kind of ductile metal, either simple or compound, as it is manifest that any of them may be pressed together in this way as well as lead and tin. Nor do I mean to confine it to any particular construction of die or mandrel, nor to any particular combination or arrangement of any die or mandrel; but

What I claim as my invention, and desire to secure by Letters Patent, is—

1. Forming a double metallic pipe or tube out of any two of the ductile metals or their alloys by pressing them together, through, over, on, or in a die in such manner as to make each of said metals form a tube or pipe, the one inside of the other.

2. Putting the tin and lead together in a cylinder over a mandrel and forcing them through a die over said mandrel so as to press a lining of tin in the pipe at the time of its formation.

3. The manufacture of lead pipe with a lining of tin by forcing an ingot of tin and an ingot of lead while over a core, out of a cylinder, through a die, by hydraulic pressure, as specified.

W. ANTHONY SHAW.

Witnesses:

AMOS BROADNAX,

PETER D. KENNY.